United States Patent
Sakakibara

(10) Patent No.: US 11,390,323 B2
(45) Date of Patent: Jul. 19, 2022

(54) PARKING ASSISTANCE SYSTEM

(71) Applicant: HONDA MOTOR CO., LTD., Tokyo (JP)

(72) Inventor: Naoya Sakakibara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/196,411

(22) Filed: Mar. 9, 2021

(65) Prior Publication Data
US 2021/0284239 A1   Sep. 16, 2021

(30) Foreign Application Priority Data

Mar. 16, 2020   (JP) .............................. JP2020-045867

(51) Int. Cl.
*G08G 1/16*   (2006.01)
*B62D 15/02*   (2006.01)

(52) U.S. Cl.
CPC ................. *B62D 15/0275* (2013.01)

(58) Field of Classification Search
CPC .. B62D 15/0275; B62D 15/0285; G08G 1/16;
G08G 1/166; G08G 1/161; G08G
1/096855; G08G 1/052; G08G 1/09626;
G08G 1/00; G08G 1/162; G08G 1/163;
G08G 1/164; G06K 9/00805; G05D
1/0044; G05D 1/0038; G05D 2201/0213;
H04N 5/272; B60W 60/0025; G06T
3/4038
See application file for complete search history.

(56) References Cited

U.S. PATENT DOCUMENTS

2016/0375831 A1* 12/2016 Wang ....................... G06F 3/048
                                                            348/148
2018/0248395 A1   8/2018 Kikuchi et al.

FOREIGN PATENT DOCUMENTS

| JP | 2015-133768 A | 7/2015 | |
| JP | 5751383 B2 * | 7/2015 | ......... B62D 15/0285 |

(Continued)

OTHER PUBLICATIONS

Office Action dated Dec. 7, 2021, issued in counterpart JP application No. 2020-045867, with English translation. (14 pages).

*Primary Examiner* — Hai Phan
*Assistant Examiner* — Anthony D Afrifa-Kyei
(74) *Attorney, Agent, or Firm* — WHDA, LLP

(57) ABSTRACT

A relative position of a power receiving unit to a power transmitting unit, represented by alignment assistance information, is corrected through a distance corresponding to a display delay time $\Delta t_1$ and a vehicle response delay time $\Delta t_2$. The relative position of one unit to the other at time $t=t_0-(\Delta t_2+\Delta t_1)$ is corrected to the relative position taken when it is assumed that a vehicle moves through a correction distance $\Delta P = \Delta P_1 + \Delta P_2$. Although a position of the power receiving unit is actually out of a chargeable area at each of the time $t=t_0-(\Delta t_2+\Delta t_1)$ and at time $t=t_0-\Delta t_2$, the alignment assistance information representing that the position of the power receiving unit is within the chargeable area is displayed on an image display device at the time $t=t_0-\Delta t_2$.

11 Claims, 6 Drawing Sheets

(56) References Cited

FOREIGN PATENT DOCUMENTS

| JP | 5751383 B2 | | 7/2015 |
|---|---|---|---|
| JP | 2018-143089 A | | 9/2018 |
| JP | 2020-018156 A | | 1/2020 |
| JP | 2020018156 A | * | 1/2020 |

* cited by examiner

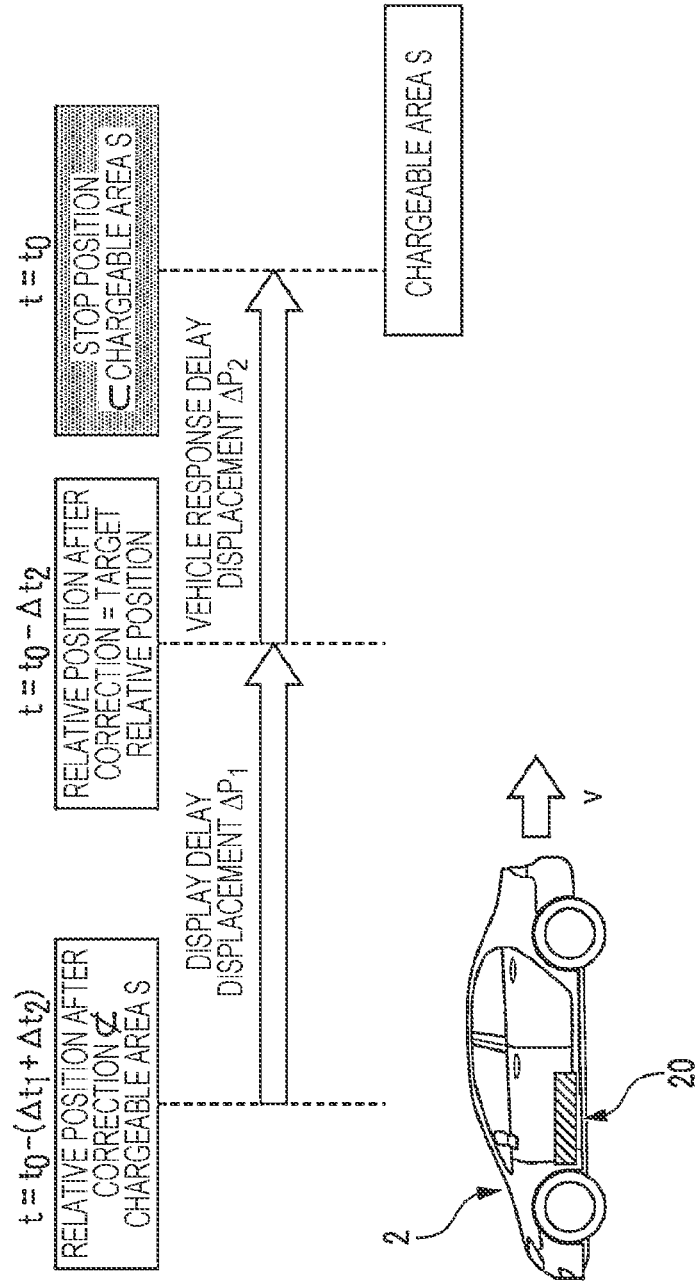

PARKING ASSISTANCE SYSTEM

CROSS REFERENCES TO RELATED APPLICATIONS

The present application claims priority under 35 U.S.C. § 119 to Japanese Patent Application No. 2020-045867, filed Mar. 16, 2020, entitled "Parking Assistance System." The contents of this application are incorporated herein by reference in their entirety.

TECHNICAL FIELD

The present disclosure relates to a system for assisting parking of a vehicle in a situation of charging an on-board battery in a non-contact manner.

BACKGROUND

A parking assistance system is proposed in which the timing to operate a vehicle is displayed in a superimposed relation to a camera image and a drawing position of a start-of-stop instruction mark is set based on information about a current position and speed of the vehicle (see, for example, Japanese Patent No. 5751383).

SUMMARY

However, there is a possibility that, when a user is going to park the vehicle while looking at the information that is displayed on an image output device to assist positioning of the vehicle, for example, the timing to step on a brake pedal is delayed. This may lead to a possibility that the accuracy in relative alignment of a power receiving unit mounted on the vehicle with respect to a power transmitting unit installed in a parking space reduces to an inappropriate level as viewed from the point of achieving efficient charging of an on-board battery.

In consideration of the above-described state of the art, it is desirable to provide a parking assistance system for assisting a user in operation of driving a vehicle such that the accuracy in relative alignment between a power transmitting unit and a power receiving unit can be improved.

A parking assistance system according to one aspect of the present disclosure includes a vehicle state recognition unit that recognizes a relative position of a power receiving unit mounted on a vehicle to a power transmitting unit that transmits electric power to the power receiving unit in a non-contact manner to charge a battery mounted on the vehicle, and an alignment assistance unit that displays, on an image display device mounted on the vehicle, alignment assistance information representing the relative position of the power receiving unit to the power transmitting unit, that relative position having been recognized by the vehicle state recognition unit, wherein the alignment assistance unit includes a delay recognition unit that recognizes a display delay time given as a delay time from recognition of the relative position by the vehicle state recognition unit until the alignment assistance information representing the relative position is displayed on the image display device, and a delay correction unit that corrects the relative position represented by the alignment assistance information and displayed on the image display device through a distance corresponding to the display delay time having been recognized by the delay recognition unit.

According to the parking assistance system having the above-described feature, the relative position of the power receiving unit to the power transmitting unit, represented by the alignment assistance information, is corrected through the distance corresponding to the display delay time. The term "display delay time" implies a delay time from the recognition of the relative position of the power receiving unit to the power transmitting unit until the alignment assistance information representing the relative position is displayed on the image display device mounted on the vehicle. The term "relative position" is used herein as a concept including, without being limited to only the relative position of one unit to the other, both the relative position and posture (relative orientation relation) of one unit to the other. The image display device may be permanently mounted on the vehicle or may be carried with a user and temporarily mounted on the vehicle.

Therefore, the user can cause the power receiving unit mounted on the vehicle to be highly accurately aligned with the power transmitting unit installed in a parking space by operating the vehicle while referring to the alignment assistance information displayed on the image display unit.

The expression of "recognizing" information is used herein as a concept including all types of arithmetic processes for processing the information into a state usable in a subsequent process and so on, such as receiving the information, reading the information from a storage device, searching the information from a database and so on, calculating, estimating, or determining the information based on the read information or the searched information, and storing the calculated or other information into the storage unit.

In the above-described parking assistance system, preferably, the delay recognition unit further recognizes a vehicle response delay time given as a delay time in operation of the vehicle with respect to a command issued in the vehicle to actuate the operation, and the delay correction unit corrects the relative position represented by the alignment assistance information and displayed on the image display device through a distance corresponding to the vehicle response delay time in addition to the display delay time having been recognized by the delay recognition unit.

According to the parking assistance system having the above-described feature, the relative position represented by the alignment assistance information is corrected through the distance corresponding to the vehicle response delay time in addition to the display delay time. The term "vehicle response delay time" implies a delay time in operation of the vehicle with respect to a command issued in the vehicle to actuate the operation. Therefore, with the user operating the vehicle while referring to the alignment assistance information displayed on the image display unit, the power receiving unit mounted on the vehicle, which is driven in accordance with the user's operation, can be highly accurately aligned with the power transmitting unit that is installed in the parking space.

In the above-described parking assistance system, preferably, the delay recognition unit recognizes the display delay time in accordance with a speed of the vehicle and recognizes the vehicle response delay time based on information about correlation between operation of a brake of the vehicle and responsivity of the brake.

According to the parking assistance system having the above-described feature, the display delay time is recognized in consideration of a tendency that a moving distance of the vehicle corresponding to the display delay time increases at a higher vehicle speed. Furthermore, the vehicle response delay time is recognized based on responsivity in operation of braking the vehicle in response to the operation of the brake. As a result, the relative position represented by the alignment assistance information is appropriately corrected taking into account not only the vehicle speed when the user parks the vehicle into the parking space, but also the brake response characteristic of the vehicle.

In the above-described parking assistance system, preferably, the alignment assistance unit displays, on the image display device, the alignment assistance information including a line segment extending, from the power receiving unit as a start point, in a moving direction of the vehicle specified in accordance with information of a steering angle of the vehicle.

According to the parking assistance system having the above-described feature, the line segment extending in the moving direction of the vehicle specified depending on the steering angle of the vehicle is displayed, as the alignment assistance information, on the image display device. Therefore, the user can check whether the line segment included in the alignment assistance information passes the power transmitting unit or approaches the power transmitting unit, and can determine whether the steering angle of the vehicle is appropriate in order to realize the alignment between both the units. As a result, the user can realize the highly accurate alignment of the power receiving unit mounted on the vehicle with the power transmitting unit installed in the parking space.

BRIEF DESCRIPTION OF THE DRAWINGS

The advantages of the disclosure will become apparent in the following description taken in conjunction with the following drawings.

FIG. 4B is an explanatory view related to the relative position represented with the alignment assistance information after correction and an actual vehicle stop position.

DESCRIPTION OF THE PREFERRED EMBODIMENTS

Configurations
Configuration of Parking Assistance System

Figure 1:
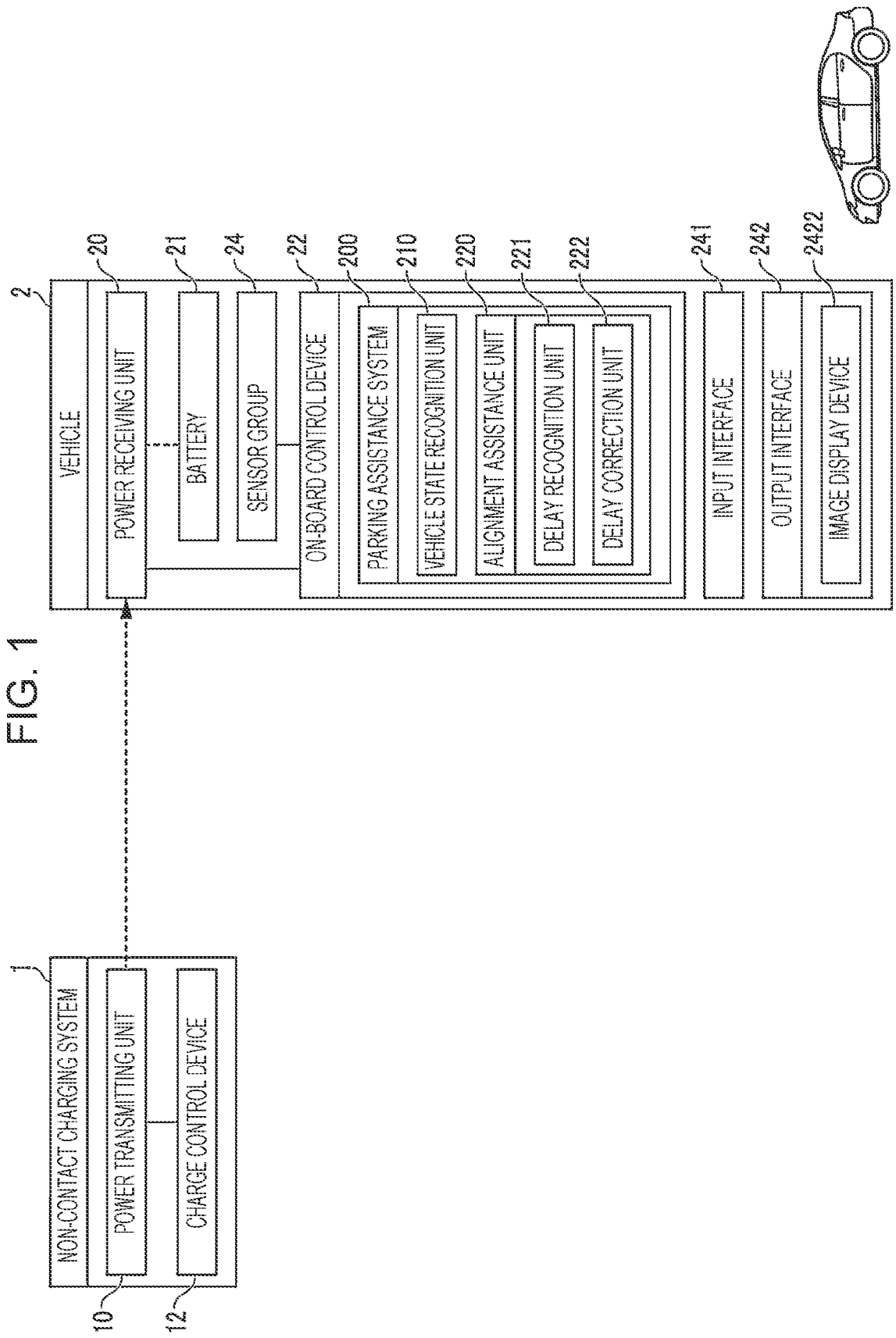
FIG. 1 is an explanatory view related to a configuration of a parking assistance system according to an embodiment of the present disclosure.

A parking assistance system 200 according to an embodiment of the present disclosure, illustrated in FIG. 1, is equipped on a vehicle 2. A non-contact charging system 1 for charging a battery 21, mounted on the vehicle 2, in a non-contact manner includes a power transmitting unit 10 and a charge control device 12. The non-contact charging system 1 has a two-way communication function with the vehicle 2.

For charging the battery 21 mounted on the vehicle 2, the power transmitting unit 10 transmits electric power to a power receiving unit 20, mounted on the vehicle 2, in a non-contact manner. The power transmitting unit 10 is installed in, for example, a parking space for the vehicle 2.

The charge control device 12 controls a power transmitting operation of the power transmitting unit 10. The charge control device 12 is constituted by an arithmetic processing unit (such as a CPU, a single-core processor, or a multi-core processor). The arithmetic processing unit reads necessary data and program (software) from a storage device (such as a HDD, a memory, or an SSD constituted by a memory) and executes arithmetic processing of the read data in accordance with the read program.

Configuration of Vehicle

The vehicle 2 illustrated in FIG. 1 includes the power receiving unit 20, the battery 21, an on-board control device 22, a sensor group 24, an input interface 241, and an output interface 242.

For charging the battery 21, the power receiving unit 20 receives electric power from the power transmitting unit 10, installed in a designated place, in a non-contact manner. The battery 21 is constituted by, for example, a lithium-ion secondary battery. The on-board control device 22 controls operations of various components of the vehicle 2 as appropriate in accordance with output signals of various sensors constituting the sensor group 24.

The on-board control device 22 includes the parking assistance system 200. As in the charge control device 12, the on-board control device 22 is constituted by a storage device (such as a HDD, a memory, or an SSD constituted by a memory) and an arithmetic processing unit (such as a CPU, a single-core processor, or a multi-core processor) that reads necessary data and program (software) from the storage device and executes arithmetic processing of the read data in accordance with the read program. The input interface 241 is constituted by touch panel buttons and switches, a voice input device as required, and so on. The output interface 242 includes an image display device 2422 and a voice output device.

The parking assistance system 200 includes a vehicle state recognition unit 210 and an alignment assistance unit 220. The vehicle state recognition unit 210 recognizes a vehicle state, such as a relative position of the power receiving unit 20 to the power transmitting unit 10, through communication with the vehicle 2 or the on-board control device 22 mounted on the vehicle 2. The alignment assistance unit 220 displays, on the image display device 2422 constituting the output interface 242 of the vehicle 2, alignment assistance information that represents the relative position of the power receiving unit 20 to the power transmitting unit 10, that relative position having been recognized by the vehicle state recognition unit 210. The alignment assistance unit 220 includes a delay recognition unit 221 and a delay correction unit 222. The delay recognition unit 221 recognizes a display delay time, namely a delay time from the recognition of the relative position by the vehicle state recognition unit 210 until the alignment assistance information representing the relative position is displayed on the image display device 2422. The delay correction unit 222 corrects the relative position represented by the alignment assistance information, which is to be displayed on the image display device 2422 constituting the output interface 242 of the vehicle 2, through a distance corresponding to the display delay time that has been recognized by the delay recognition unit 221.

The parking assistance system 200, the vehicle state recognition unit 210, and the alignment assistance unit 220, the latter two being components of the parking assistance system 200, are constituted by an arithmetic processing unit (such as a CPU, a single-core processor, or a multi-core processor). The arithmetic processing unit reads necessary data and program (software) from a storage device (such as a HDD, a memory, or an SSD constituted by a memory) and executes arithmetic processing of the read data in accordance with the read program.

Although the on-board control device 22, the input interface 241, and the output interface 242 may be constituted as on-board units that are permanently mounted on the vehicle 2, they may be constituted by an information processing terminal, such as a smartphone or a tablet terminal, which is carried with a user and is temporarily mounted on the vehicle 2.

Functions

An example of the functions of the parking assistance system 200 having the above-described configuration will be described below with reference to a flowchart of FIG. 2. Those functions are enabled after, as illustrated in FIG. 3A, the vehicle 2 including the power receiving unit 20 has come close to the parking space where the power transmitting unit 10 is installed and the communication between the non-contact charging system 1 and the vehicle 2 has been established.

Figure 2:
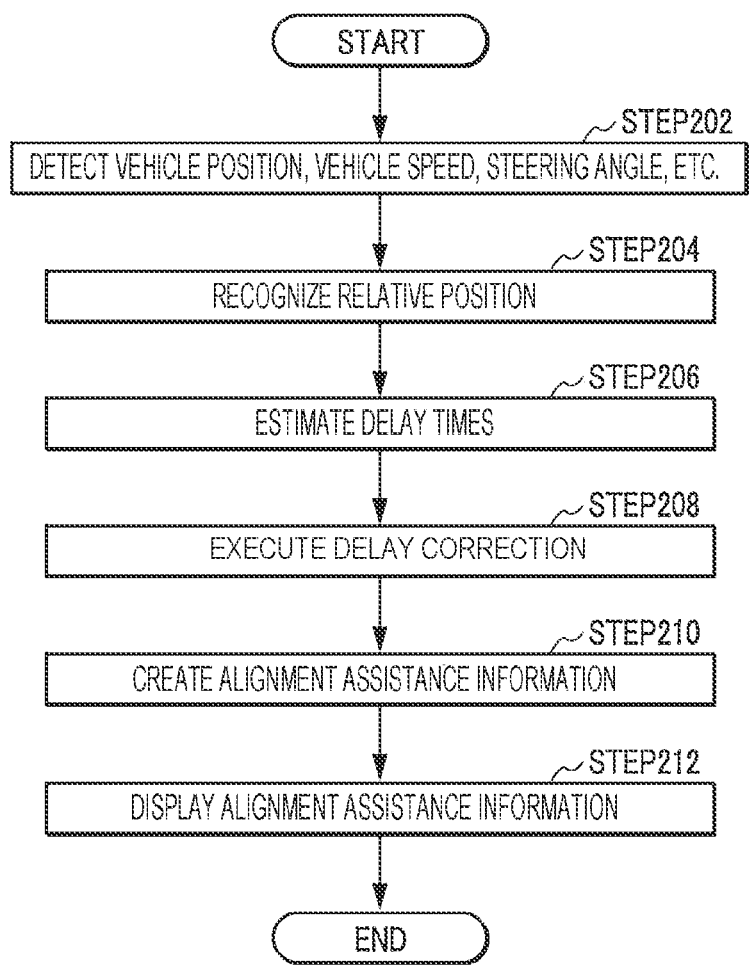
FIG. 2 is an explanatory view related to functions of the parking assistance system according to the embodiment of the present disclosure.
Figure 3A:
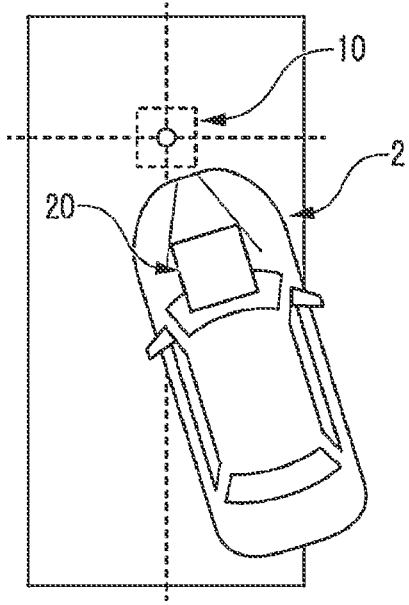
FIG. 3A is an explanatory view related to a relative position of a vehicle to a parking space.

First, a position, a speed, and a steering angle of the vehicle 2 are recognized by the vehicle state recognition unit 210 based on output signals from a positioning sensor, a vehicle speed sensor, and a steering angle sensor which constitute the sensor group 24 in the vehicle 2 (FIG. 2/STEP 202). The positioning sensor is constituted by, for example, GPS and an acceleration sensor if necessary. In such a case, coordinate values (defined by latitude and longitude) of the vehicle 2 in a world coordinate system are detected in accordance with a GPS signal (or a GPS signal and an acceleration signal). The positioning sensor may be constituted by an image pickup device (for example, a single-lens CCD camera or a multi-lens camera) and/or a ranging sensor (for example, a TOF sensor). In such a case, coordinate values of the vehicle 2 in a power-transmitting-unit coordinate system $(X_1, Y_1)$ including an origin $P_1$ of which position and posture are fixed with respect to the power transmitting unit 10, as illustrated in FIG. 3B, may be detected based on an image that has been taken by the image pickup device and that represents a state of the surroundings of the vehicle 2 including the power transmitting unit 10 and/or on a distance from the vehicle 2 to the power transmitting unit 10, the distance being measured by the ranging sensor.

Furthermore, the vehicle state recognition unit 210 recognizes the relative position of the power receiving unit 20 to the power transmitting unit 10 based on the detection result of the position of the vehicle 2 among the results of the above-mentioned detections (FIG. 2/STEP 204). More specifically, the vehicle state recognition unit 210 reads a position $P_1$ (coordinate values in the world coordinate system) of the power transmitting unit 10, illustrated in FIG. 3B, from a storage device in cooperation with the charge control device 12. Moreover, a position $P_2$ (coordinate values in the world coordinate system) of the power receiving unit 20, illustrated in FIG. 3B, is obtained based on the position (coordinate values in the world coordinate system) of the vehicle 2, that position being detected as one of the vehicle states. Then, a deviation of the coordinate values of the power receiving unit 20 relative to those of the power transmitting unit 10 in the world coordinate system is determined as the relative position of the power receiving unit 20 to the power transmitting unit 10. When the detection result of the position of the vehicle 2 is expressed by the coordinate values in the power-transmitting-unit coordinate system $(X_1, Y_1)$ illustrated in FIG. 3B, the position $P_2$ of the power receiving unit 20 in the power-transmitting-unit coordinate system may be obtained from the above-mentioned detection result.

Figure 3B:
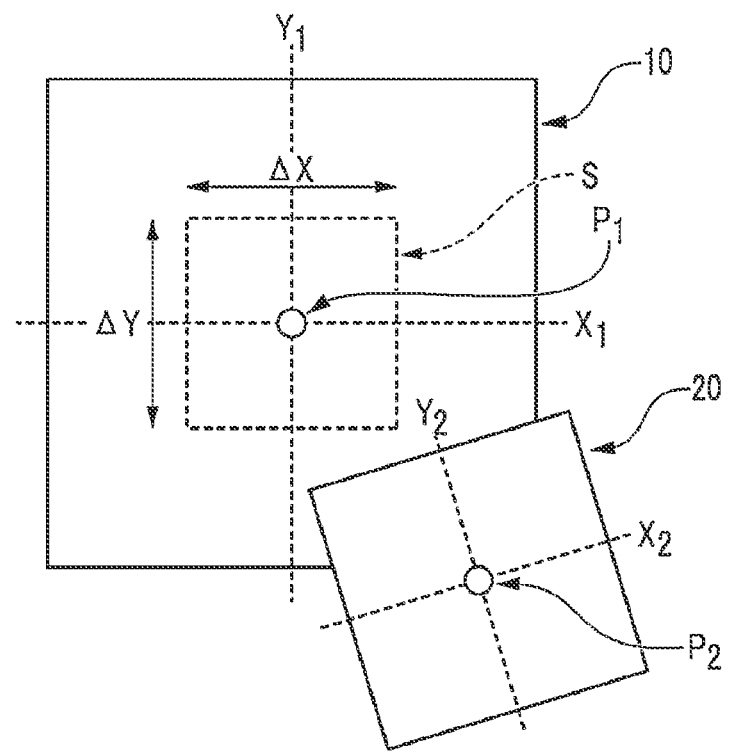
FIG. 3B is an explanatory view related to a relative position of a power receiving unit to a power transmitting unit.

The term "relative position" is used herein as a concept including a relative posture as well, namely a posture of the power-receiving-unit coordinate system $(X_2, Y_2)$ in the world coordinate system on the basis of a posture of the power-transmitting-unit coordinate system $(X_1, Y_1)$ in the world coordinate system, both the power-transmitting-unit and power-receiving-unit coordinate systems being illustrated in FIG. 3B.

Figure 4A:
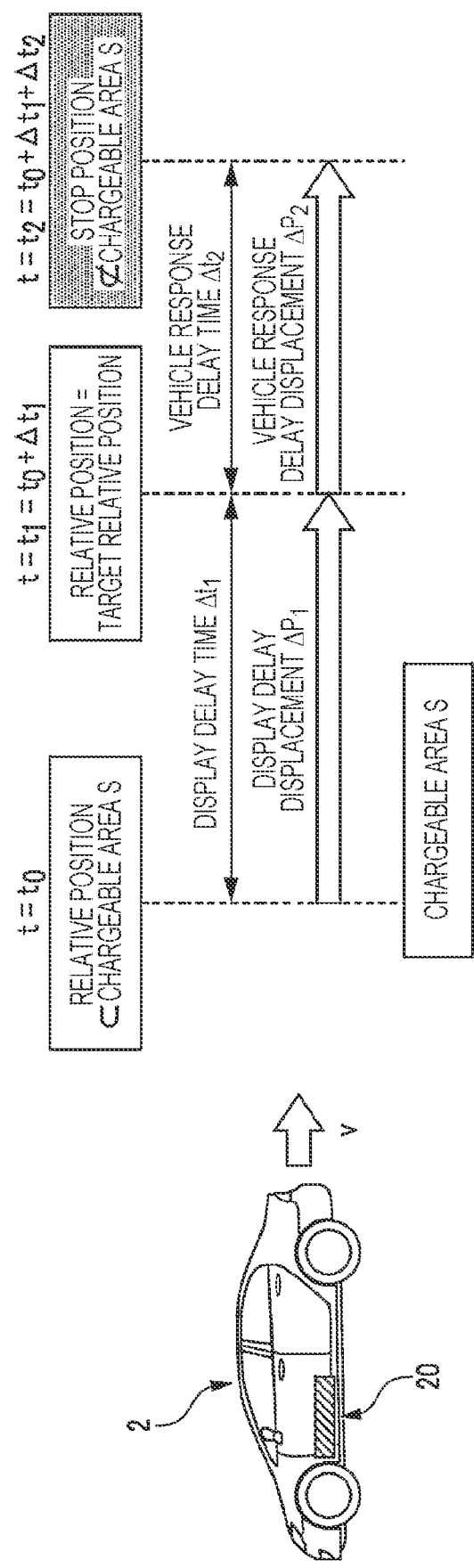
FIG. 4A is an explanatory view related to deviations of a vehicle stop position corresponding to a display delay and a vehicle response delay.

Furthermore, the delay recognition unit 221 recognizes a display delay time $\Delta t_1$ and a vehicle response delay time $\Delta t_2$ (FIG. 2/STEP 206). The display delay time $\Delta t_1$ diagrammatically illustrated in FIG. 4A is a delay time from the recognition of the relative position of one unit to the other by the vehicle state recognition unit 210 until the alignment assistance information representing the relative position is displayed on the image display device 2422 constituting the output interface 242 of the vehicle 2. The vehicle response delay time $\Delta t_2$ diagrammatically illustrated in FIG. 4A is a delay time in operation of the vehicle 2 (for example, braking operation upon pressing of a brake) with respect to a command issued in the vehicle 2 to actuate the operation (for example, a brake operation command).

Let now assume the case, by way of example, in which, as illustrated in FIG. 4A, when the vehicle 2 is moving at a vehicle speed v in the parking space, the position $P_2$ of the power receiving unit 20 is located inside a chargeable area S at time $t=t_0$. As illustrated in FIG. 3B, for example, the chargeable area S is a rectangular area having a height $\Delta x$ and a width $\Delta y$ with the center position $P_1$ of the power transmitting unit 10 being a reference.

In the above case, the alignment assistance information representing the relative position of one unit to the other at the time $t=t_0$ is displayed on the image display device 2422 constituting the output interface 242 of the vehicle 2 at time $t=t_1=t_0+\Delta t_1$ after the display delay time $\Delta t_1$ from the time $t=t_0$ as diametrically illustrated in FIG. 4A. During such a delay, the vehicle 2 is displaced through a distance $\Delta P_1 = v \times \Delta t_1$, thus causing a possibility that the position $P_2$ of the power receiving unit 20 will be out of the chargeable area S.

Moreover, at the time $t=t_1=t_0+\Delta t_1$, the user (driver) steps on the brake pedal to stop the vehicle 2 in accordance with the alignment assistance information that has been displayed on the image display device 2422 constituting the output interface 242 of the vehicle 2. It is assumed here that a biological response delay in the above-mentioned braking operation is negligibly small. Accordingly, the brake (braking device) is actuated and the vehicle 2 is stopped at time $t=t_2=t_0+\Delta t_1+\Delta t_2$ after the vehicle response delay time $\Delta t_2$ from the time $t=t_1$ as diametrically illustrated in FIG. 4A. During such a delay, the vehicle 2 is further displaced through a distance $\Delta P_2 = v \times \Delta t_2$, thus increasing a possibility that the position $P_2$ of the power receiving unit 20 will be out of the chargeable area S.

In consideration of the above point, the relative position represented by the alignment assistance information to be displayed on the image display device 2422 constituting the output interface 242 is corrected by the delay correction unit 222 through a distance corresponding to the sum of the display delay time $\Delta t_1$ and the vehicle response delay time $\Delta t_2$ both having been recognized by the delay recognition unit 221 (FIG. 2/STEP 208). Hence, in accordance with the detection result of the vehicle speed v among the states of the vehicle 2 (see FIG. 2/STEP 202) having been recognized by the vehicle state recognition unit 210, the relative position of the power receiving unit 20 to the power transmitting unit 10 is corrected to the relative position after the vehicle 2 has moved through a distance $\Delta P=\Delta P_1+\Delta P_2=v\times(\Delta t_1+\Delta t_2)$.

Then, the alignment assistance unit 220 creates the alignment assistance information representing the relative position after the correction (FIG. 2/STEP 210). For example, the alignment assistance information is created so as to present a simulated top view img(top) of the vehicle 2 illustrated on the right side in FIG. 5, namely an image on which an image img20 representing the power receiving unit 20 is arranged at the relative position after the correction with respect to an image img10 representing the power transmitting unit 10.

Figure 5:
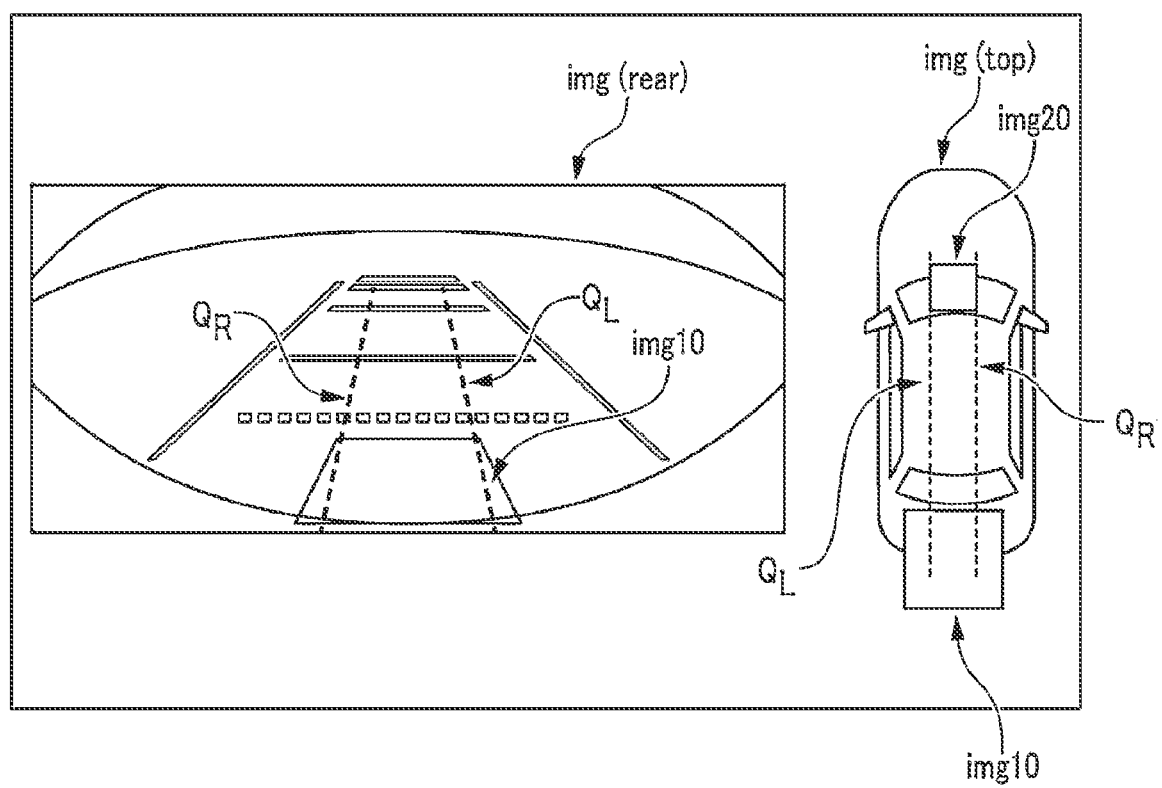
FIG. 5 is an explanatory view related to a display example of the alignment assistance information.

In this embodiment, based on the detection result of the steering angle among the states of the vehicle 2 (see FIG. 2/STEP 202) having been recognized by the vehicle state recognition unit 210, the alignment assistance information is created so as to present a top view img(top), as illustrated on the right side in FIG. 5, on which a pair of left and right line segments $Q_L$ and $Q_R$ extending from the image img20, which represents the power receiving unit 20, in a moving direction of the vehicle 2 specified depending on the steering angle are indicated in a superimposed manner. The number of the line segments may be one or three or more.

Furthermore, the alignment assistance information is created so as to present a vehicle rear image img(rear) representing a situation on the rear side of the vehicle 2 as illustrated on the left side in FIG. 5, the vehicle rear image img(rear) being taken by a rear camera constituting the sensor group 24 and including the image img10 representing the power transmitting unit 10 at a position that is deviated from an actually-image-taken position through the distance corresponding to the correction of the relative position. The alignment assistance information is further created so as to present a vehicle rear image img(rear) in which the pair of left and right line segments $Q_L$ and $Q_R$ are displayed in a superimposed manner. Coordinate transform between the world coordinate system or the power-transmitting-unit coordinate system and a taken-image coordinate system is realized with a rotation matrix and a translation matrix each representing the relative position of the power receiving unit 20 to the power transmitting unit 10.

The alignment assistance information is displayed by the alignment assistance unit 220 on the image display device 2422 constituting the output interface 242 (FIG. 2/STEP 212). Thus, as illustrated in FIG. 5, the vehicle rear image img(rear) and the top view img(top) are displayed as the alignment assistance information on the image display device 2422.

Advantageous Effects

According to the parking assistance system 200 constituted as described above, the relative position of the power receiving unit 20 to the power transmitting unit 10, represented by the alignment assistance information, is corrected through the distance corresponding to the display delay time $\Delta t_1$ and the vehicle response delay time $\Delta t_2$.

In this case, as illustrated in FIG. 4B in a simulated manner, the relative position of one unit to the other at time $t=t_0-(\Delta t_2+\Delta t_1)$ is corrected to the relative position taken when it is assumed that the vehicle 2 moves through the correction distance $\Delta P=\Delta P_1+\Delta P_2$. Moreover, the alignment assistance information representing the relative position after the correction is displayed on the image display device 2422 constituting the output interface 242 of the vehicle 2 at time $t=t_0-\Delta t_2$ later than the time $t=t_0$ by the display delay time $\Delta t_1$. Accordingly, although the position $P_2$ of the power receiving unit 20 is actually out of the chargeable area S at each of the time $t=t_0-(\Delta t_2+\Delta t_1)$ and the time $t=t_0-\Delta t_2$, the alignment assistance information representing that the position $P_2$ of the power receiving unit 20 is within the chargeable area S is displayed on the image display device 2422 at the time $t=t_0-\Delta t_2$.

Furthermore, at the time $t=t_1=t_0-\Delta t_2$, the user (driver) steps on the brake pedal to stop the vehicle 2 in accordance with the alignment assistance information displayed on the image display device 2422 constituting the output interface 242 of the vehicle 2. Therefore, the brake (braking device) is actuated and the vehicle 2 is stopped, as illustrated in FIG. 4B in a simulated manner, at the time $t=t_0$ later than the time $t=t_0-\Delta t_2$ by the vehicle response delay time $\Delta t_2$. During a period until the stopping, the vehicle 2 is further displaced through the distance $\Delta P_2=v\times\Delta t_2$, whereby the position $P_2$ of the power receiving unit 20 comes into the chargeable area S.

As described above, the power receiving unit 20 mounted on the vehicle 2 can be highly accurately aligned with the power transmitting unit 10 installed in the parking space by the user operating the vehicle 2 while referring to the alignment assistance information displayed on the image display device 2422.

In addition, the alignment assistance information including the line segments $Q_L$ and $Q_R$ extending, from the power receiving unit 20 (or the image img20 thereof) as a start point, in the moving direction of the vehicle specified in accordance with the information of the steering angle of the vehicle 2 is displayed on the image display device 2422 (see FIG. 5). Therefore, the user can check whether the line segments $Q_L$ and $Q_R$ included in the alignment assistance information pass the power transmitting unit 10 (or the image img10 thereof) or approach the power transmitting unit 10, and can determine whether the steering angle of the vehicle 2 is appropriate in order to realize the alignment between both the units 10 and 20. As a result, the user can realize the highly-accurate alignment of the power receiving unit 20 mounted on the vehicle 2 with the power transmitting unit 10 installed in the parking space.

Other Embodiments of Present Disclosure

In the above-described embodiment, the parking assistance system 200 is constituted by the on-board control device 22 mounted on the vehicle 2. In another embodiment, however, the parking assistance system may be constituted by the charge control device 12 of the non-contact charging system 1. In that case, the vehicle states detected by the sensor group 24 on the vehicle 2 may be transmitted to the non-contact charging system 1 and, in accordance with the detected vehicle states, the relative position of the power receiving unit 20 to the power transmitting unit 10, the display delay time $\Delta t_1$, and/or the vehicle response delay time $\Delta t_2$ may be recognized by the parking assistance system in the charge control device 12 instead of the vehicle 2. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A parking assistance system comprising:
a vehicle state recognition unit that recognizes a relative position of a power receiving unit mounted on a vehicle to a power transmitting unit that transmits electric power to the power receiving unit in a non-contact manner to charge a battery mounted on the vehicle; and
an alignment assistance unit that displays, on an image display device on the vehicle, alignment assistance information representing the relative position of the power receiving unit to the power transmitting unit recognized by the vehicle state recognition unit,
wherein the alignment assistance unit comprises:
a delay recognition unit that recognizes:
  a display delay time given as a delay time between a time of recognition of the relative position by the vehicle state recognition unit and a time when the alignment assistance information representing the relative position is displayed on the image display device, and
  a vehicle response delay time given as a delay time in an operation of the vehicle between a time when a brake of the vehicle is applied by a user in response to the alignment assistance information displayed on the image display device and a time when the vehicle is stopped; and
a delay correction unit that corrects the relative position included in the alignment assistance information displayed on the image display device according to the display delay time and the vehicle response delay time recognized by the delay recognition unit.

2. The parking assistance system according to claim 1, wherein the delay recognition unit recognizes the display delay time in accordance with a speed of the vehicle and recognizes the vehicle response delay time based on information about correlation between operation of applying the brake of the vehicle and responsivity of the brake.

3. The parking assistance system according to claim 1, wherein the alignment assistance unit displays, on the image display device, the alignment assistance information including a line segment extending, from the power receiving unit as a start point, in a moving direction of the vehicle specified in accordance with information of a steering angle of the vehicle.

4. The parking assistance system according to claim 1, wherein the relative position includes a relative posture or a relative orientation of the power receiving unit to the power transmitting unit.

5. The parking assistance system according to claim 1, wherein the delay correction unit corrects the relative position based on a distance which the vehicle moves during the display delay time.

6. The parking assistance system according to claim 1, wherein the delay correction unit corrects the relative position based on a distance which the vehicle moves during the vehicle response delay time.

7. A vehicle comprises the parking assistance system according to claim 1.

8. A mobile device comprises the parking assistance system according to claim 1.

9. A non-contact charging device comprises the parking assistance system according to claim 1 and the power transmitting unit according to claim 1.

10. A parking assistance method comprising steps of:
(i) recognizing, by a computer, a relative position of a power receiving unit mounted on a vehicle to a power transmitting unit that transmits electric power to the power receiving unit in a non-contact manner to charge a battery mounted on the vehicle;
(ii) displaying, by a computer, on an image display device on the vehicle, alignment assistance information representing the relative position of the power receiving unit to the power transmitting unit,
wherein the step (ii) comprises:
recognizing, by a computer, a display delay time given as a delay time between a time of recognition of the relative position and a time when the alignment assistance information representing the relative position is displayed on the image display device, and a vehicle response delay time given as a delay time in an operation of the vehicle between a time when a brake of vehicle is applied by a user in response to the alignment assistance information displayed on the image display device and a time when the vehicle is stopped; and
correcting, by a computer, the relative position included in the alignment assistance information displayed on the image display device according to the display delay time and the vehicle response delay time.

11. The parking assistance system according to claim 1, wherein the delay correction unit corrects the relative position included in the alignment assistance information displayed on the image display device according to the display delay time and the vehicle response delay time before the brake of vehicle is applied by the user in response to the alignment assistance information displayed on the image display device.

* * * * *